Patented Sept. 12, 1933

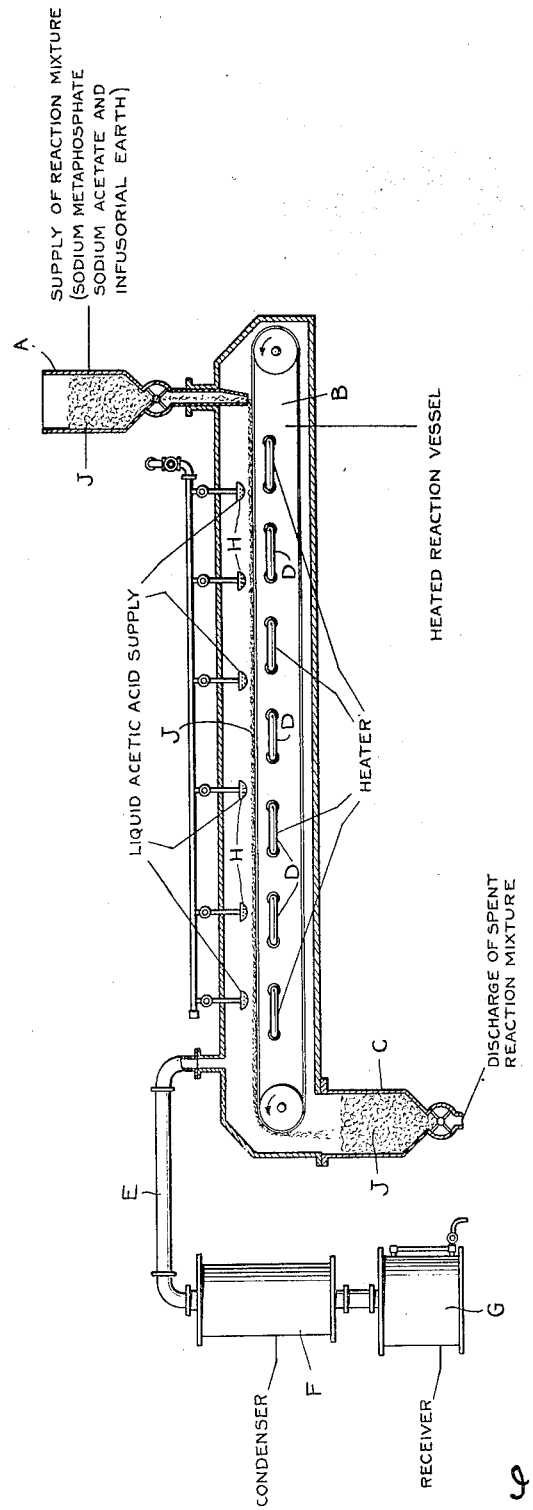

1,926,087

UNITED STATES PATENT OFFICE 1,926,087

MANUFACTURE OF ALIPHATIC ACID ANHYDRIDES

Henry Dreyfus, London, and Walter Bader, Spondon, near Derby, England, assignors to Celanese Corporation of America, a corporation of Delaware Application July 16, 1928, Serial No. 293,303, and in Great Britain July 23, 1927

14 Claims. (Cl. 260—123)

This invention relates to the manufacture of anhydrides of aliphatic acids and especially to the manufacture of acetic anhydride.

According to the invention we have now found that aliphatic anhydrides (and especially acetic anhydride) can be satisfactorily produced by treating liquid aliphatic acids and/or metal salts of aliphatic acids with phosphoric acids of lower degree of hydration than orthophosphoric acid and/or salts of such phosphoric acids (as for instance with metaphosphoric acid or pyrophosphoric acid or with alkali or earth alkali salts of metaphosphoric or pyrophosphoric acid).

According to one form of execution of the invention we may mix acetic acid, preferably glacial acetic acid, (in presence or absence of acetic anhydride), with a sodium salt of a metaphosphoric acid, the reaction being accelerated by heating or preferably boiling the mixture. By this means a high yield of acetic anhydride may be readily produced, the anhydride being separated from the reaction mixture, for instance, by distillation or by filtration with or without subsequent distillation.

According to the relative proportions of metaphosphate and acetic acid employed, acid sodium pyrophosphate or acid sodium orthophosphate are produced with the acetic anhydride. For instance when substantially equimolecular proportions of acetic acid and of the metaphosphate (reckoned as $NaPO_3$) are employed the residue consists largely or mainly of acid sodium pyrophosphate, whereas if about two molecular equivalents of acetic acid are employed the residue consists largely or mainly of acid sodium orthophosphate; in these cases the reactions probably proceed according to the equations:—

(a) 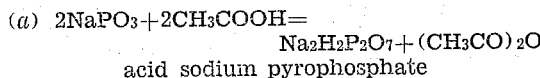
acid sodium pyrophosphate (b) 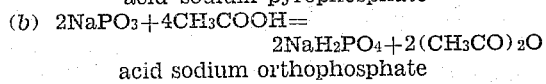
acid sodium orthophosphate In order to utilize the dehydrating capacity of the metaphosphate to the full we preferably use sufficient acetic acid to transform the metaphosphate to acid sodium orthophosphate, e. g. about 2 molecules of acetic acid for each molecule of metaphosphate (reckoned as $NaPO_3$). By using excess of acetic acid (i. e. an excess over the 2 molecules) mixtures of acetic acid and acetic anhydride may be obtained which are highly useful for industrial acetylation processes such for instance as the manufacture of cellulose acetate.

When the residue contains acid sodium pyrophosphate it may, with or without separation of the acetic anhydride, be employed for reaction with further acetic acid to produce further acetic anhydride. For instance a further molecular proportion of acetic acid (or if desired an excess of acetic acid) may be added to the residue and the mixture again heated or boiled and the anhydride so produced recovered as above described.

The residues from the reactions (whether such residues consist substantially of acid orthophosphate or acid pyrophosphate or of mixtures of such phosphates) may readily be transformed into metaphosphate which may be made to serve for treating fresh quantities of acetic acid, and thus the process may be conducted as a continuous cycle of operations. For instance the residues may be heated, in a manner known for the production of metaphosphates from acid orthophosphates or acid pyrophosphates, and the metaphosphate so produced treated with fresh acetic acid in the manner above described; or when the residues consist substantially of acid orthophosphate they may if desired be heated to form acid pyrophosphate instead of metaphosphate, which acid pyrophosphate may similarly be treated with fresh acetic acid.

According to another form of execution of the invention we may employ a metal acetate, for instance, an alkali or alkali earth acetate, instead of acetic acid. The acetates are preferably employed in their anhydrous form.

In such form of execution we may for example melt sodium acetate with a sodium salt of a metaphosphoric acid and separate the anhydride by distillation or by filtration with or without subsequent distillation.

Preferably however we perform the reaction in presence of a non-aqueous diluent, such for example as acetic anhydride. For instance, we may heat, or preferably boil, a mixture of a sodium metaphosphate and sodium acetate with acetic anhydride and recover the acetic anhydride so produced by distillation or by filtration with or without subsequent distillation. By these means highly satisfactory yields of acetic anhydride may be obtained.

According to relative proportions of metaphosphate and acetate employed neutral pyrophosphate or neutral (trisodium) orthophosphate are produced together with the anhydride. Thus, for instance, when substantially equimolecular proportions of the metaphosphate (reckoned as NaPO₃) and sodium acetate are employed the residue consists largely or mainly of neutral sodium pyrophosphate, whereas if about two molecular equivalents of sodium acetate are employed the residue consists largely or mainly of neutral (trisodium) orthophosphate, in these cases the reactions probably proceed according to the equations:—

(c) 2NaPO₃+2CH₃COONa=
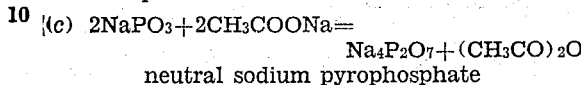
neutral sodium pyrophosphate (d) 2NaPO₃+4CH₃COONa=
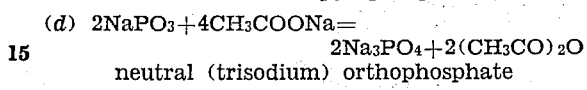
neutral (trisodium) orthophosphate In order to utilize the dehydrating capacity of the metaphosphate to the full we preferably use sufficient sodium acetate to transform the metaphosphate to the neutral (trisodium) orthophosphate.

When the residue from the reaction contains neutral sodium pyrophosphate it may, with or without separation of the acetic anhydride, be employed to react with further quantities of sodium acetate or with acetic acid. For instance a further molecular equivalent of sodium acetate may be added to the residue and the mixture heated, or preferably boiled after dilution with acetic anhydride, and the acetic anhydride so produced recovered as above described.

Where the residues consist largely or mainly of neutral pyrophosphate or of neutral orthophosphate they may be recovered as metaphosphate or as neutral pyrophosphate by suitable treatment after acidification (preferably with acetic acid) and the process thus made a continuous cycle of operations. For instance, when the residues consist largely or mainly of neutral (trisodium) orthophosphate, it may be mixed with about one molecular equivalent of aqueous acetic acid whereby a mixture of disodium hydrogen phosphate and sodium acetate may be produced. This mixture may be evaporated to dryness, and by further heating (preferably under reduced pressure) transformed into a mixture of sodium pyrophosphate and sodium acetate. This resulting mixture may be heated, or preferably boiled with a suitable non-aqueous solvent, such for instance, as acetic anhydride, to produce further acetic anhydride.

Or, for instance, when the residue consists largely or mainly of neutral (trisodium) orthophosphate or of neutral sodium pyrophosphate, the residue may be treated with acids in known manner to produce disodium hydrogen phosphate (Na₂HPO₄). This may then be treated with aqueous acetic acid and ammonia to produce a mixture of sodium ammonium phosphate (microcosmic salt) and sodium acetate which may be separated by fractional crystallization, for instance, by cooling the solution at suitable concentration whereby the sodium ammonium phosphate is largely or entirely precipitated and the sodium acetate remains in solution. The separated sodium ammonium phosphate may then be heated to produce sodium metaphosphate which may then be treated with fresh acetic acid or sodium acetate to produce further acetic anhydride. The sodium acetate separated from the sodium ammonium phosphate may be recovered from the solution and utilized for the production of acetic anhydride by the process of the invention. The ammonia liberated on heating the sodium ammonium phosphate may be used for treating disodium hydrogen phosphate (and especially disodium hydrogen phosphate prepared as described above) to produce further quantities of sodium ammonium phosphate for use in the process.

It will thus be seen that the utilization of the residues and the execution of the process as a continuous cycle of operations though somewhat more complicated when salts of acetic acid are employed instead of acetic acid, still enables very efficient recovery and utilization of the reagents.

It will be understood that the above forms of execution of the invention are given only by way of illustration and are in no way limitative.

Instead of sodium acetate we may employ potassium acetate or other alkali or earth alkali or other metal acetate.

Further we may employ mixtures of sodium acetate or other alkali or earth alkali or other metal acetate with acetic acid.

When employing mixtures of acetates and acetic acid we preferably employ excess acetic acid to act as diluent for the reaction. For instance we may heat, or preferably boil, a mixture of sodium acetate and a sodium metaphosphate (or pyrophosphate) after dilution with glacial acetic acid or after dilution with a mixture of acetic acid and acetic anhydride, and recover the acetic anhydride so produced by distillation or by filtration with or without subsequent distillation.

Instead of acetic acid or acetates we may employ any other aliphatic acids or sodium or other alkali or alkali earth or other metal salts of such acids.

Instead of sodium salts of phosphoric acids of lower degree of hydration than orthophosphoric acid we may employ potassium or any other salts (including acid salts) of such acids.

According to another form of execution of the invention we may for instance mix acetic acid, preferably glacial acetic acid (in presence or absence of acetic anhydride) with a metaphosphoric acid and heat, or preferably boil, the mixture to accelerate the reaction. By this means acetic anhydride may readily be produced, the anhydride being separated from the reaction mixture, for instance, by distillation.

According to the relative proportions of the metaphosphoric acid and the acetic acid employed pyrophosphoric acid or orthophosphoric acid are produced with the anhydride. For instance when substantially equimolecular proportions of acetic acid and metaphosphoric acid (reckoned as HPO₃) are employed the metaphosphoric acid is transformed largely or entirely to pyrophosphoric acid, whereas if about 2 molecular equivalents of acetic acid are employed metaphosphoric acid is transformed largely or entirely to orthophosphoric acid; in these cases the reactions probably proceed according to the equations:—

(e) 2HPO₃+2CH₃COOH=(CH₃CO)₂O+H₄P₂O₇
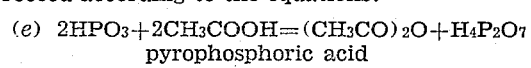
pyrophosphoric acid (f) 2HPO₃+4CH₃COOH=(CH₃CO)₂O+2H₃PO₄
orthophosphoric acid In order to utilize the dehydrating capacity of the metaphosphoric acid to the full we preferably use sufficient acetic acid to transform metaphosphoric acid to orthophosphoric acid e. g. about two molecules of acetic acid for each molecule of metaphosphoric acid (reckoned as HPO₃). By using excess acetic acid (i. e. excess over the 2 molecules) mixtures of acetic acid and acetic anhydride may be obtained which are highly useful for industrial acetylation processes such for instance as the manufacture of cellulose acetate.

When the residue from the reaction contains pyrophosphoric acid it may, with or without separation of the acetic anhydride be employed for reaction with further acetic acid to produce further acetic anhydride. For instance, a further molecular proportion of acetic acid (or, if desired, an excess of acetic acid) may be added to the residue and the mixture again heated or boiled and the anhydride so produced recovered as above described.

The residues from the reactions (whether such residues consist substantially of orthophosphoric acid or of pyrophosphoric acid or of mixtures of such acids) may readily be transformed into a metaphosphoric acid, which may be made to serve for treating fresh quantities of acetic acid, and thus the process may be conducted as a continuous cycle of operations. For instance the residues may be heated, in the manner known for the production of metaphosphoric acids from orthophosphoric acid or pyrophosphoric acid, and the metaphosphoric acid so produced treated with fresh acetic acid in the manner above described; or when the residues consist substantially of orthophosphoric acid they may if desired be heated to form pyrophosphoric acid instead of metaphosphoric acid, which pyrophosphoric acid may similarly be treated with fresh acetic acid.

According to another and more preferable form of execution of the invention we may employ a metal acetate, for instance, an alkali or earth alkali acetate, instead of acetic acid.

In such form of execution we may, for example, heat a mixture of sodium acetate and a metaphosphoric acid and separate the anhydride by distillation. Preferably, however, we perform the reaction in presence of a non-aqueous diluent, such for instance as acetic anhydride. For instance, we may heat, or preferably boil, a mixture of a metaphosphoric acid and sodium acetate with acetic anhydride and recover the acetic anhydride so produced by distillation or by filtration with or without subsequent distillation. By these means highly satisfactory yields of acetic anhydride may be obtained.

According to the relative proportions of the metaphosphoric acid and the acetate employed acid sodium pyrophosphate or disodium hydrogen phosphate are produced together with the anhydride. Thus, for instance, when substantially equimolecular proportions of the metaphosphoric acid (reckoned as $HPO_3$) and sodium acetate are employed the residue consists largely or mainly of acid sodium pyrophosphate, whereas if about 2 molecular equivalents of sodium acetate are employed the residue consists largely or mainly of disodium hydrogen phosphate, in these cases the reactions probably proceed according to the equations:—

(g) $2HPO_3 + 2CH_3COONa =$
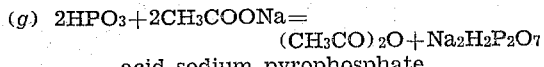
acid sodium pyrophosphate (h) $2HPO_3 + 4CH_3COONa =$
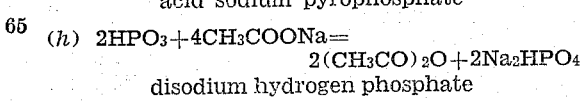
disodium hydrogen phosphate In order to utilize the dehydrating capacity of the metaphosphoric acid to the full we preferably use sufficient acetate to transform the metaphosphoric acid to disodium hydrogen phosphate.

When the residue from the reaction contains acid sodium pyrophosphate it may, with or without separation of the acetic anhydride, be employed to react with further quantities of sodium acetate or with acetic acid. For instance, a further molecular equivalent of sodium acetate may be added and the mixture heated, or preferably boiled, after dilution with acetic anhydride, and the acetic anhydride so produced recovered as above described.

Where the residues consist largely or mainly of acid sodium pyrophosphate or disodium hydrogen phosphate they may be recovered as metaphosphoric acid or pyrophosphoric acid by a suitable treatment, and thus the process may be conducted as a continuous cycle of operations. For instance, when the residue consists largely or mainly of disodium hydrogen phosphate it may be acidified in known matter to produce orthophosphoric acid which may be heated to produce a metaphosphoric acid or pyrophosphoric acid which may then be treated with fresh acetic acid or sodium acetate to produce further acetic anhydride. Or, for instance, when the residue consists largely or mainly of acid sodium pyrophosphate it may be treated with acids in known manner to produce an orthophosphate. This may then be treated with acids in known manner to produce orthophosphoric acid which may be heated to produce a metaphosphoric acid or a pyrophosphoric acid which may then be treated with fresh acetic acid or sodium acetate to produce further acetic anhydride.

Or, if desired, the residue from the reaction may be heated in known manner to produce a sodium metaphosphate or pyrophosphate which may be employed for the production of further quantities of anhydride in the manner hereinbefore indicated. It will be understood that the above forms of execution of the invention are given only by way of illustration and are in no way limitative.

Instead of sodium acetate we may employ potassium acetate or other alkali or earth alkali or other metal acetate.

Further we may employ mixtures of sodium acetate or other alkali or other metal acetate with acetic acid.

When employing mixtures of acetates and acetic acid we preferably employ excess acetic acid to act as diluent for the reaction. For instance, we may heat, or preferably boil, a mixture of sodium acetate with a metaphosphoric acid after dilution with glacial acetic acid or after dilution with a mixture of acetic anhydride and acetic acid, and recover the anhydride so produced, by distillation or by filtration with or without subsequent distillation.

In performing the invention with acetates or mixtures thereof with acetic acid, the acetates should preferably be employed in their anhydrous form.

Instead of acetic acid or acetates we may employ any other aliphatic acids or sodium or other alkali or alkali earth or other metal salts of such acids.

In performing the invention we may, as hereinbefore indicated, heat or boil the various reaction mixtures to accelerate the formation of the anhydride. Whilst such reaction mixtures may be heated or boiled in any suitable manner, the best results appear to be obtained when the heating or boiling is performed at temperatures of between about 100° and 250° C. and especially at temperatures of from about 120° and 180° C. In cases where acetic or other aliphatic acid is caused to react with the said phosphoric acid (and/or phosphate) and where the boiling point of the said aliphatic acid is not sufficiently raised by admixture with the phosphoric acid (and/or phosphate) to enable the reaction mixture to be boiled at the desired temperature, the boiling may of course be performed under increased pressure, pressures of up to 3 atmospheres usually sufficing for this purpose.

In cases where salts (i. e. either salts of aliphatic acids or salts of said phosphoric acids or salts of both of such acids) are employed for producing the anhydride it is often advantageous to mix indifferent powders, such for instance as, kieselguhr or infusorial earth with the reaction mixtures, such admixing serving in many cases to prevent caking.

It will of course be understood that in cases where the anhydride is distilled from the reaction mixtures, such distillation may be effected under any desired pressure, e. g. under normal atmospheric pressure or under reduced pressure. Further, if desired, such distillation may be aided by blowing air, carbon dioxide or other indifferent gas through the reaction vessel.

The following examples serve to illustrate one form of execution of the invention, it being understood that these are given only by way of illustration and in no way as limitative.

*Example 1*

100 lbs. of sodium metaphosphate in the form of a fine dry powder is mixed with 150 lbs. of anhydrous powdered sodium acetate and 20 lbs. of dry infusorial earth. The resulting mixture is stirred in a pan and heated to about 150° C. The pan is closed and connected with a condenser and receiver. Glacial acetic acid is slowly and continuously added to the mixture at such speed that the mixture appears just moist. The heating and addition of acetic acid are maintained so long as acetic anhydride appears in the distillate, then the acetic acid supply is cut off and the residue distilled dry. The residue remaining after distillation is composed substantially of trisodium orthophosphate whilst the distillate is composed substantially of 85 to 90 lbs. of acetic anhydride and about 350 lbs. glacial acetic acid.

*Example 2*

A mixture of 100 parts of sodium metaphosphate (in the form of a fine dry powder), 150 parts of anhydrous powdered sodium acetate and 20 parts of dry infusorial earth is caused to pass in any suitable and continuous manner into and through a reaction vessel heated to about 150° to 180° C., the vessel being provided with a condenser and receiver. In its passage through the reaction vessel glacial acetic acid in liquid form is added to the powder at one or more places along the path of the powder, the addition of acetic acid being such as to keep the powder just moist. The acetic anhydride so formed passes, with acetic acid, to the receiver and condenser; whilst the powder is caused to pass continuously from the reaction vessel. By such means, acetic anhydride may readily be produced and by regulating the passage of the reaction powder the sodium metaphosphate may be decomposed substantially entirely to trisodium orthophosphate.

Referring to the accompanying drawing, the figure illustrates diagrammatically apparatus that may be employed for the process described in this example. On the drawing, the reaction mixture J passes continuously into and through the heated reaction vessel B, entering the vessel B from the supply hopper A and leaving the vessel B by the discharge C. In its passage through the vessel B, the reaction mixture J is kept just moist by the addition of acetic acid at the points H. The anhydride so formed passes, with the acetic acid, by way of the pipe E to the condenser F and receiver G.

For convenience and brevity the aliphatic acids and their metal salts are all referred to in the claims by the term "body of formula RCOOR¹" (where R is an alkyl group and $R^1$ is hydrogen or a metal). Likewise the acetic acid and metal acids are referred to in the claims as "body of formula CH₃COOR'" (where $R^1$ equals hydrogen or a metal).

What we claim and desire to secure by Letters Patent is:—

1. Process for the manufacture of an aliphatic anhydride which comprises subjecting to a temperature not exceeding the boiling point of its constituents a reaction mixture comprising at least one body of formula R.COOR' (where R is an alkyl group and R' equals hydrogen or a metal) and at least one body selected from the group consisting of the phosphoric acids of lower degree of hydration than orthophosphoric acid, and their salts.

2. Process for the manufacture of acetic anhydride which comprises subjecting to a temperature not exceeding the boiling point of its constituents a reaction mixture comprising at least one body of the formula CH₃COOR' (where R' equals hydrogen or a metal) and at least one body selected from the group consisting of the phosphoric acids of lower degree of hydration than orthophosphoric acid, and their salts.

3. Process for the manufacture of an aliphatic anhydride which comprises subjecting to a temperature not exceeding the boiling point of its constituents a reaction mixture comprising at least one body of formula R.COOR' (where R is an alkyl group and R' equals hydrogen or a metal) and at least one body selected from the group consisting of a metaphosphoric acid and a salt of a metaphosphoric acid.

4. Process for the manufacture of acetic anhydride which comprises subjecting to a temperature not exceeding the boiling point of its constituents a reaction mixture comprising at least one body of the formula CH₃COOR' (where R' equals hydrogen or a metal) and at least one body selected from the group consisting of a metaphosphoric acid and a salt of a metaphosphoric acid.

5. Process for the manufacture of acetic anhydride which comprises subjecting to a temperature not exceeding the boiling point of its constituents a reaction mixture comprising an alkali metal salt of acetic acid and at least one body selected from the group consisting of a metaphosphoric acid and a salt of a metaphosphoric acid.

6. In a process according to claim 5, the step of adding liquid acetic acid to the reaction mixture throughout the reaction in an amount sufficient to keep the reaction mixture moist.

7. Process for the manufacture of acetic anhydride which comprises forming a reaction mixture comprising sodium acetate and an alkali salt of a metaphosphoric acid; and subjecting the resulting reaction mixture to a temperature not exceeding the boiling point of the reaction mixture.

8. In a process according to claim 7, the step of adding liquid acetic acid to the reaction mixture throughout the reaction in amount sufficient to keep the reaction mixture moist.

9. Process for the manufacture of an aliphatic anhydride which comprises subjecting to the action of superatmospheric pressure and a temperature not exceeding the boiling point of its constituents a reaction mixture comprising at least one body of formula R.COOR' (where R is an alkyl group and R' equals hydrogen or a metal) and at least one body selected from the group consisting of phosphoric acids of lower degree of hydration than orthophosphoric acid, and their salts.

10. Process for the manufacture of acetic anhydride which comprises subjecting to the action of superatmospheric pressure and a temperature not exceeding the boiling point of its constituents a reaction mixture comprising at least one body of the formula $CH_3COOR'$ (where R' equals hydrogen or a metal) and at least one body selected from the group consisting of phosphoric acids of lower degree of hydration than orthophosphoric acid, and their salts.

11. Process according to claim 1, and comprising forming the reaction mixture with a quantity of at least one body of formula $RCOOR^1$ sufficient to hydrate phosphoric acid radicle present in the reaction mixture to the state of $PO_4$.

12. Process according to claim 7, and comprising forming the reaction mixture with a quantity of sodium acetate sufficient to hydrate phosphoric acid radicle present in the eraction mixture to the state of $PO_4$.

13. Process for the manufacture of acetic anhydride, which comprises forming a reaction mixture of 100 parts of powdered sodium metaphosphate, 150 parts of anhydrous sodium acetate, and 20 parts of infusorial earth, heating the resulting reaction mixture to a temperature between 150 and 180 degrees C., and keeping the reaction mixture moist by the addition of acetic acid throughout the reaction.

14. Process according to claim 13, and comprising passing said reaction mixture continuously into and through a heated reaction vessel, wherein said mixture is heated to a temperature between 150 and 180° C., keeping said reaction mixture moist by adding liquid acetic acid thereto at least one point in the path of said mixture through said reaction vessel.

HENRY DREYFUS.
WALTER BADER.